(12) United States Patent
Roundy et al.

(10) Patent No.: US 9,141,790 B2
(45) Date of Patent: *Sep. 22, 2015

(54) SYSTEMS AND METHODS FOR USING EVENT-CORRELATION GRAPHS TO DETECT ATTACKS ON COMPUTING SYSTEMS

(71) Applicant: Symantec Corporation, Mountain View, CA (US)

(72) Inventors: Kevin Roundy, El Segundo, CA (US); Fanglu Guo, Los Angeles, CA (US); Sandeep Bhatkar, Sunnyvale, CA (US); Tao Cheng, Chengdu (CN); Jie Fu, Chengdu (CN); Zhi Kai Li, Zigong (CN); Darren Shou, La Jolla, CA (US); Sanjay Sawhney, Cupertino, CA (US); Acar Tamersoy, Atlanta, GA (US); Elias Khalil, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/041,762

(22) Filed: Sep. 30, 2013

(65) Prior Publication Data

US 2015/0074806 A1 Mar. 12, 2015

Related U.S. Application Data

(63) Continuation of application No. PCT/CN2013/083228, filed on Sep. 10, 2013.

(51) Int. Cl.
*G06F 21/00* (2013.01)
*G06F 21/55* (2013.01)
(Continued)

(52) U.S. Cl.
CPC .............. *G06F 21/55* (2013.01); *G06F 21/577* (2013.01); *H04L 63/1433* (2013.01)

(58) Field of Classification Search
CPC .... G06F 21/577; G06F 21/55; H04L 63/1433
See application file for complete search history.

(56) References Cited

U.S. PATENT DOCUMENTS 7,624,448 B2 * 11/2009 Coffman ......................... 726/23
7,735,141 B1 * 6/2010 Noel et al. ...................... 726/25
(Continued)

FOREIGN PATENT DOCUMENTS

| CN | 102571469 | 7/2012 |
|---|---|---|
| CN | 102893289 | 1/2013 |
| EP | 2515250 | 10/2012 |

OTHER PUBLICATIONS

Adam Glick, et al.; Systems and Methods for User-Directed Malware Remediation; U.S. Appl. No. 13/419,360, filed Mar. 13, 2012.

(Continued)

*Primary Examiner* — Michael Pyzocha
(74) *Attorney, Agent, or Firm* — ALG Intellectual Property, LLC

(57) ABSTRACT

A computer-implemented method for using event-correlation graphs to detect attacks on computing systems may include (1) detecting a suspicious event involving a first actor within a computing system, (2) constructing an event-correlation graph that includes a first node that represents the first actor, a second node that represents a second actor, and an edge that interconnects the first node and the second node and represents a suspicious event involving the first actor and the second actor, (3) calculating, based at least in part on the additional suspicious event, an attack score for the event-correlation graph, (4) determining that the attack score is greater than a predetermined threshold, and (5) determining, based at least in part on the attack score being greater than the predetermined threshold, that the suspicious event may be part of an attack on the computing system. Various other methods, systems, and computer-readable media are also disclosed.

20 Claims, 12 Drawing Sheets

(51) Int. Cl.
  *G06F 21/57* (2013.01)
  *H04L 29/06* (2006.01)

(56) References Cited

U.S. PATENT DOCUMENTS

| | | | |
|---|---|---|---|
| 7,861,300 B2 | 12/2010 | Arnold et al. | |
| 8,104,090 B1* | 1/2012 | Pavlyushchik | 726/24 |
| 8,341,745 B1 | 12/2012 | Chau et al. | |
| 8,555,385 B1* | 10/2013 | Bhatkar et al. | 726/22 |
| 8,566,938 B1 | 10/2013 | Prakash et al. | |
| 8,793,790 B2* | 7/2014 | Khurana et al. | 726/22 |
| 8,881,288 B1* | 11/2014 | Levy et al. | 726/25 |
| 2005/0138413 A1* | 6/2005 | Lippmann et al. | 713/201 |
| 2006/0212941 A1* | 9/2006 | Bronnikov et al. | 726/24 |
| 2007/0209074 A1* | 9/2007 | Coffman | 726/23 |
| 2007/0226796 A1* | 9/2007 | Gilbert et al. | 726/22 |
| 2008/0313734 A1* | 12/2008 | Rozenberg et al. | 726/22 |
| 2009/0138590 A1* | 5/2009 | Lee et al. | 709/224 |
| 2009/0144308 A1 | 6/2009 | Huie et al. | |
| 2010/0031093 A1* | 2/2010 | Sun et al. | 714/45 |
| 2010/0082513 A1* | 4/2010 | Liu | 706/46 |
| 2010/0115620 A1* | 5/2010 | Alme | 726/24 |
| 2010/0180344 A1* | 7/2010 | Malyshev et al. | 726/23 |
| 2010/0186088 A1* | 7/2010 | Banerjee et al. | 726/23 |
| 2010/0192226 A1 | 7/2010 | Noel et al. | |
| 2010/0235879 A1* | 9/2010 | Burnside et al. | 726/1 |
| 2011/0047620 A1 | 2/2011 | Mahaffey et al. | |
| 2011/0083180 A1* | 4/2011 | Mashevsky et al. | 726/23 |
| 2011/0252032 A1* | 10/2011 | Fitzgerald et al. | 707/737 |
| 2012/0137367 A1* | 5/2012 | Dupont et al. | 726/25 |
| 2012/0216280 A1* | 8/2012 | Zorn et al. | 726/23 |
| 2012/0246720 A1* | 9/2012 | Xie et al. | 726/22 |
| 2013/0042294 A1 | 2/2013 | Colvin et al. | |
| 2013/0246605 A1* | 9/2013 | Mahadik et al. | 709/224 |
| 2013/0318616 A1* | 11/2013 | Christodorescu et al. | 726/25 |
| 2013/0333032 A1 | 12/2013 | Delatorre et al. | |
| 2014/0165195 A1* | 6/2014 | Brdiczka et al. | 726/23 |
| 2014/0283026 A1* | 9/2014 | Striem et al. | 726/22 |
| 2014/0310808 A1* | 10/2014 | Yao et al. | 726/22 |
| 2014/0365646 A1 | 12/2014 | Xiong | |
| 2015/0047026 A1* | 2/2015 | Neil et al. | 726/22 |

OTHER PUBLICATIONS

Carey Nachenberg, et al.; Systems and Methods for Neutralizing File-Format-Specific Exploits Included Within Files Contained Within Electronic Communications; U.S. Appl. No. 13/418,332, filed Mar. 12, 2012.

Leylya Yumer, et al.; Systems and Methods for Analyzing Zero-Day Attacks; U.S. Appl. No. 13/901,977, filed May 24, 2013.

Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.

Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.

William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.

Splunk, Inc.; Detecting Advanced Persistent Threats—Using Splunk for APT; Jan. 4, 2012; Tech Brief; http://www.splunk.com/web_assets/pdfs/secure/Splunk_for_APT_Tech_Brief.pdf, as accessed Aug. 8, 2013.

Triumfant, Inc.; Detecting the Advanced Persistent Threat; Nov. 30, 2010; www.triumfant.com/advanced_persistent_threat.asp, as accessed Aug. 8, 2013.

EMC Corporation; Advanced Persistent Threat (APT) and Rootkit Detection; 2012; http://www.siliciumsecurity.com/advanced-persistent-threats-and-rootkits-detection/, as accessed Aug. 8, 2013.

Fanglu Guo, et al; Systems and Methods for Reducing False Positives When Using Event-Correlation Graphs to Detect Attacks on Computing Systems; U.S. Appl. No. 14/031,044, filed Sep. 19, 2013.

Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.

Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.

Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.

Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.

Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).

Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.

Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).

Zamlot, Loai et al., "Prioritizing intrusion analysis using Dempster-Shafer theory", http://dl.acm.org/citation.cfm?id=2046694, as accessed Nov. 13, 2013, AlSec '11 Proceedings of the 4th ACM workshop on Security and artificial intelligence, ACM, New York, NY, (2011), 59-70.

Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.

Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.

Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).

Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.

Tedesco, Gianni et al., "Real-Time Alert Correlation with Type Graphs", http://dl.acm.org/citation.cfm?id=1496279, as accessed

(56) References Cited

OTHER PUBLICATIONS

Nov. 13, 2013, ICISS '08 Proceedings of the 4th International Conference on Information Systems Security, Springer-Verlag Berlin, Heidelberg, (2008), 173-187.
Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Bruce McCorkendale, et al; Systems and Methods for Detecting Malware; U.S. Appl. No. 13/422,702, filed Mar. 16, 2012.
Acar Tamersoy, et al; Systems and Methods for Adjusting Suspiciousness Scores in Event-Correlation Graphs; U.S. Appl. No. 14/138,891; filed Dec. 23, 2013.
Paleari, Roberto et al.,"Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).

"Advanced Persistent Threat (APT) Attack & Zero-Day Protection", http://www.fireeye.com/, as accessed Feb. 6, 2014, FireEye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Mandiant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703; filed Mar. 21, 2014.
Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).
Constantin, Lucian, "Attackers used known exploit to steal customer log-in credentials, vBulletin maker says", http://www.networkworld.com/article/2171967/access-control/attackers-used-known-exploit-to-steal-customer-log-in-credentials--vbulletin-maker-sa.html, IDG News Service, Network World, (Nov. 18, 2013).
"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).
Dezert, Jean et al., "On the Validity of Dempster-Shafer Theory", Fusion 2012—15th International Conference on Information Fusion, Singapour, Singapore, (Jul. 2012).

* cited by examiner

SYSTEMS AND METHODS FOR USING EVENT-CORRELATION GRAPHS TO DETECT ATTACKS ON COMPUTING SYSTEMS

CROSS REFERENCE TO RELATED APPLICATION

This application is a continuation of International Application No. PCT/CN2013/083228, filed 10 Sep. 2013, the disclosure of which is incorporated, in its entirety, by this reference.

BACKGROUND

In recent years, malicious programmers have created a variety of sophisticated targeted attacks aimed at high-profile or high-level entities, such as governments, corporations, political organizations, defense contractors, or the like. In many cases, the goal of such targeted attacks is to gain access to highly sensitive or confidential information, such as financial information, defense-related information, and/or intellectual property (e.g., source code), and/or to simply disrupt an entity's operations.

Many security software companies attempt to combat targeted attacks by creating and deploying malware signatures (e.g., hash functions that uniquely identify known malware) to their customers on a regular basis. However, a significant number of the above-mentioned attacks involve malware that has been carefully crafted to take advantage of an as-yet-undiscovered vulnerability of a particular application (commonly known as a "zero-day" exploit). As such, these attacks are often difficult for traditional security software to detect and/or neutralize since the exploits in question have yet to be publicly discovered.

In addition to or as an alternative to a signature-based approach, some security software companies may apply a variety behavior-based heuristics to detect targeted attacks. Unfortunately, a significant number of targeted attacks (e.g., advance persistent threats) may obscure their malicious behaviors by moving at a slow pace such that traditional security software may be unable to distinguish individual malicious behaviors of the targeted attacks from legitimate behaviors. Accordingly, the instant disclosure identifies an addresses a need for systems and methods for detecting attacks on computing systems.

SUMMARY

As will be described in greater detail below, the instant disclosure generally relates to systems and methods for using event-correlation graphs to detect attacks on computing systems. In one example, a computer-implemented method for using event-correlation graphs to detect attacks on computing systems may include (1) detecting a suspicious event involving a first actor within a computing system, (2) constructing, in response to detecting the suspicious event involving the first actor, an event-correlation graph that includes at least a first node that represents the first actor, a second node that represents a second actor, and an edge that interconnects the first node and the second node and represents a suspicious event involving the first actor and the second actor, (3) calculating, based at least in part on the additional suspicious event involving the first actor and the second actor, an attack score for the event-correlation graph, (4) determining that the attack score is greater than a predetermined threshold, and (5) determining, based at least in part on the attack score being greater than the predetermined threshold, that the suspicious event may be part of an attack on the computing system.

In some examples, the step of constructing the event-correlation graph may include, for each actor represented by a node within the event-correlation graph, (1) identifying a set of events that involve the actor and at least one additional actor and (2) adding, for each event within the set of events, an additional node to the event-correlation graph that represents the additional actor and an additional edge that interconnects the node and additional node and represents the event involving the actor and the additional actor. In at least one example, the set of events may include a set of suspicious events.

In some embodiments, the step of constructing the event-correlation graph may include, for each actor represented by a node within the event-correlation graph, (1) identifying a set of suspicious events that involve the actor and no other actor and (2) associating each suspicious event within the set of suspicious events with the node that represents the actor.

In some examples, each suspicious event represented within the event-correlation graph may be associated with a suspiciousness score, and the step of calculating the attack score for the event-correlation graph may be based at least in part on the suspiciousness score of each suspicious event represented within the event-correlation graph.

In some embodiments, the step of calculating the attack score for the event-correlation graph may include (1) calculating a score for each edge within the event-correlation graph based at least in part on a suspiciousness score associated with the suspicious event represented by the edge and (2) calculating the attack score for the event-correlation graph based at least in part on the score for each edge within the event-correlation graph.

In some examples, the step of calculating the attack score for the event-correlation graph may include (1) calculating a score for each node within the event-correlation graph based at least in part on a suspiciousness score associated with each suspicious event associated with the node and (2) calculating the attack score for the event-correlation graph based at least in part on the score for each node within the event-correlation graph.

In some embodiment, the computer-implemented method for using event-correlation graphs to detect attacks on computing systems may further include removing, before calculating an attack score for an event-correlation graph, at least one low-scoring region of nodes from the event-correlation graph based at least in part on a score of the low-scoring region of nodes being less than a predetermined threshold.

In some examples, the computer-implemented method for using event-correlation graphs to detect attacks on computing systems may further include removing, before calculating an attack score for an event-correlation graph, at least one remote node from the event-correlation graph based at least in part on a distance of the remote node from the first node being greater than a predetermined threshold.

In some embodiments, the computer-implemented method for using event-correlation graphs to detect attacks on computing systems may further include displaying a graphical representation of an event-correlation graph to an administrator of the computing system.

In one embodiment, a system for implementing the above-described method may include (1) a detecting module that detects a suspicious event involving a first actor within a computing system, (2) a constructing module that constructs, in response to detecting the suspicious event involving the first actor, an event-correlation graph that includes at least a first node that represents the first actor, a second node that represents a second actor within the computing system, and an edge that interconnects the first node and the second node and represents an additional suspicious event involving the first actor and the second actor, (3) a score-calculating module that calculates, based at least in part on the additional suspicious event involving the first actor and the second actor, an attack score for the event-correlation graph, (4) a threshold-determining module that determines that the attack score is greater than a predetermined threshold, (5) an attack-determining module that determines, based at least in part on the attack score being greater than the predetermined threshold, that the suspicious event may be part of an attack on the computing system, and (6) at least one processor that executes the detecting module, the constructing module, the score-calculating module, the threshold-determining module, and the attack-determining module.

In some examples, the above-described method may be encoded as computer-readable instructions on a non-transitory computer-readable-storage medium. For example, a computer-readable-storage medium may include one or more computer-executable instructions that, when executed by at least one processor of a computing device, may cause the computing device to (1) detect a suspicious event involving a first actor within a computing system, (2) construct, in response to detecting the suspicious event involving the first actor, an event-correlation graph that includes at least a first node that represents the first actor, a second node that represents a second actor, and an edge that interconnects the first node and the second node and represents an additional suspicious event involving the first actor and the second actor, (3) calculate, based at least in part on the additional suspicious event involving the first actor and the second actor, an attack score for the event-correlation graph, (4) determine that the attack score is greater than a predetermined threshold, and (5) determine, based at least in part on the attack score being greater than the predetermined threshold, that the suspicious event may be part of an attack on the computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
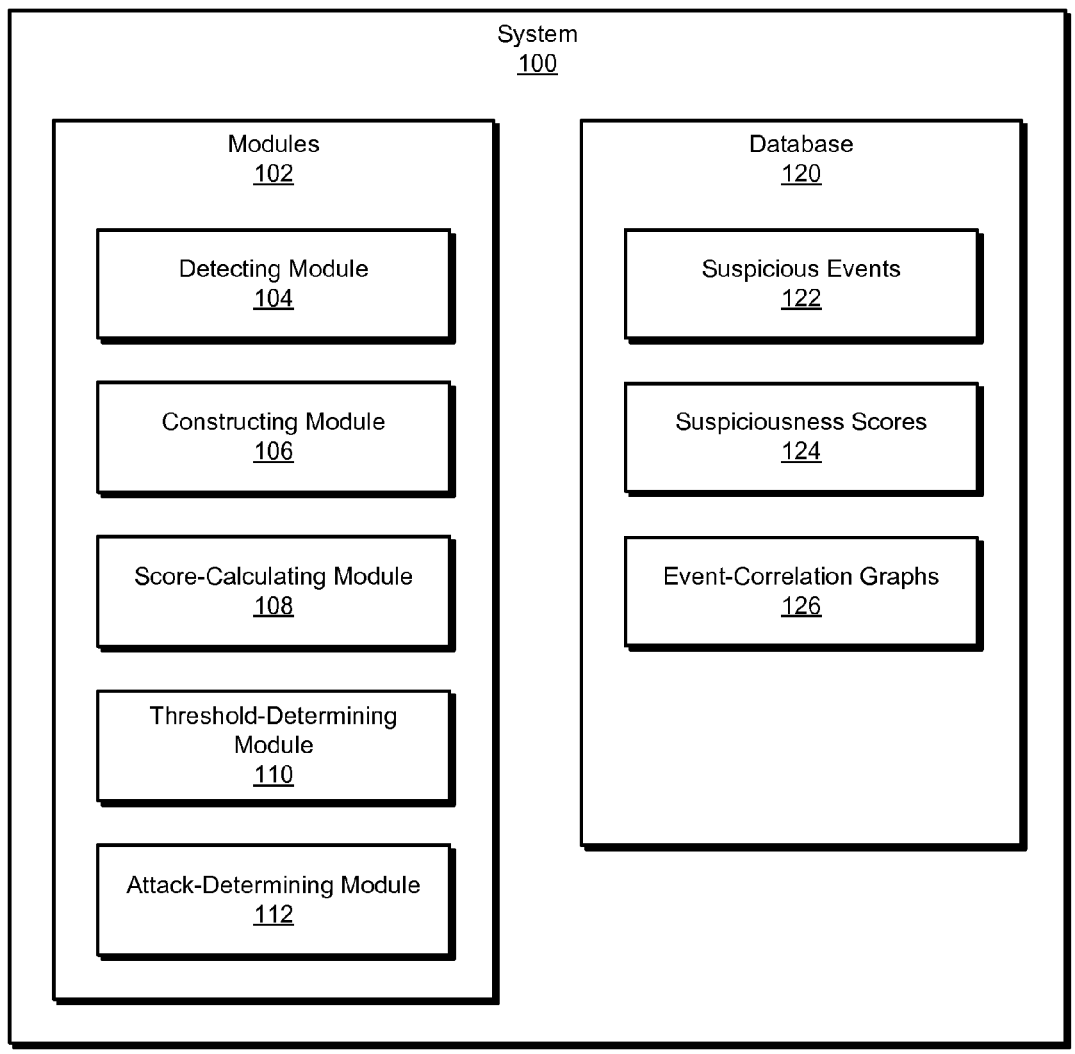
FIG. 1 is a block diagram of an exemplary system for using event-correlation graphs to detect attacks on computing systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for using event-correlation graphs to detect attacks on computing systems. As will be explained in greater detail below, by using suspicious events to construct event-correlation graphs based on how the actors involved in the suspicious events are related by the suspicious events, the systems and methods described herein may enable the detection of targeted attacks on computing systems. Furthermore, in some examples, by detecting attacks on computing systems using a graph-based correlation approach, these systems and methods may generate information that may provide a greater understanding of the attacks (e.g., the actors and methods involved in the attacks). Embodiments of the instant disclosure may also provide various other advantages and features, as discussed in greater detail below.

Figure 2:
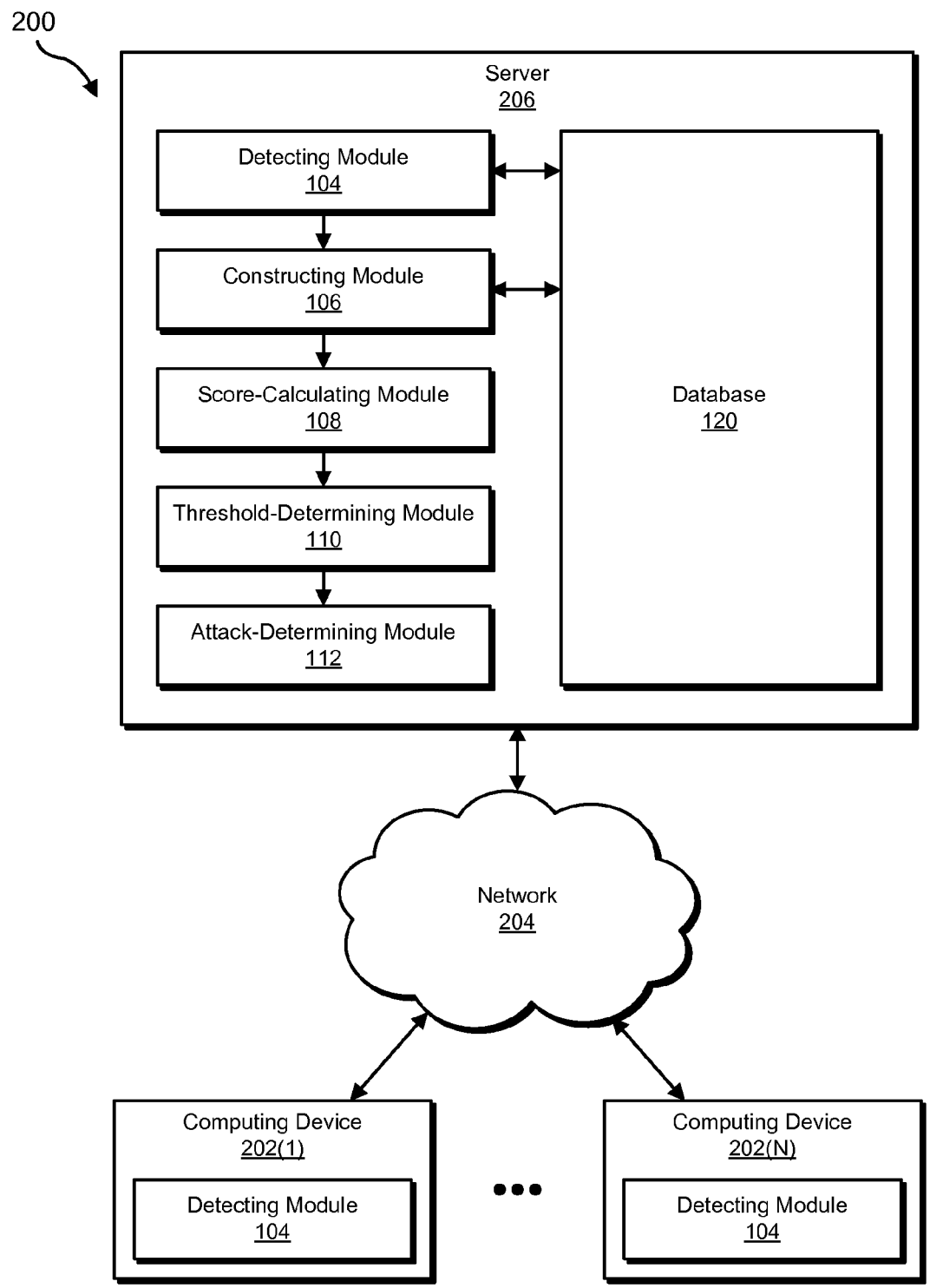
FIG. 2 is a block diagram of an additional exemplary system for using event-correlation graphs to detect attacks on computing systems.

The following will provide, with reference to FIGS. 1-2, detailed descriptions of exemplary systems for using event-correlation graphs to detect attacks on computing systems. Detailed descriptions of corresponding computer-implemented methods will also be provided in connection with FIGS. 3-10. In addition, detailed descriptions of an exemplary computing system and network architecture capable of implementing one or more of the embodiments described herein will be provided in connection with FIGS. 11 and 12, respectively.

FIG. 1 is a block diagram of an exemplary system 100 for using event-correlation graphs to detect attacks on computing systems. As illustrated in this figure, exemplary system 100 may include one or more modules 102 for performing one or more tasks. For example, and as will be explained in greater detail below, exemplary system 100 may include a detecting module 104 that detects a suspicious event involving a first actor within a computing system. Exemplary system 100 may also include a constructing module 106 that constructs an event-correlation graph in response to detecting the suspicious event involving the first actor.

In addition, and as will be described in greater detail below, exemplary system 100 may include a score-calculating module 108 that calculates an attack score for the event-correlation graph. Exemplary system 100 may also include a threshold-determining module 110 that determines that the attack score is greater than a predetermined threshold. Exemplary system 100 may further include an attack-determining module 112 that determines that the suspicious event may be part of an attack on the computing system based at least in part on the attack score being greater than the predetermined threshold. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 1110 in FIG. 11, and/or portions of exemplary network architecture 1200 in FIG. 12. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include suspicious events 122 for storing information about one or more suspicious events, suspiciousness scores 124 for storing information about suspiciousness scores associated with suspicious events, and event-correlation graphs 126 for storing information about one or more event-correlation graphs.

Database 120 may represent portions of a single database or computing device or a plurality of databases or computing devices. For example, database 120 may represent a portion of server 206 in FIG. 2, computing system 1110 in FIG. 11, and/or portions of exemplary network architecture 1200 in FIG. 12. Alternatively, database 120 in FIG. 1 may represent one or more physically separate devices capable of being accessed by a computing device, such as server 206 in FIG. 2, computing system 1110 in FIG. 11, and/or portions of exemplary network architecture 1200 in FIG. 12.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. In one example, computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of one or more of computing devices 202(1)-(N) and/or server 206, enable one or more of computing devices 202(1)-(N) and/or server 206 to use event-correlation graphs to detect attacks on system 200. For example, and as will be described in greater detail below, one or more of modules 102 may cause one or more of computing devices 202(1)-(N) and/or server 206 to (1) detect a suspicious event involving a first actor within system 200, (2) construct an event-correlation graph (e.g., event-correlation graph 400 in FIG. 4) in response to detecting the suspicious event involving the first actor, (3) calculate an attack score for the event-correlation graph based on the suspicious event involving the first actor, (4) determine that the attack score is greater than a predetermined threshold, and (5) determine that the suspicious event may be part of an attack on system 200 based at least in part on the attack score being greater than the predetermined threshold.

Computing devices 202(1)-(N) generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, routers, switches, embedded systems, combinations of one or more of the same, exemplary computing system 1110 in FIG. 11, portions of exemplary network architecture 1200 in FIG. 12, or any other suitable computing device. As illustrated in FIG. 2, computing devices 202(1)-(N) may each include detecting module 104 that may detect suspicious events that occur on each of computing devices 202(1)-(N) and/or transmit information about the suspicious events to server 206.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1200 in FIG. 12, or the like. Network 204 may facilitate communication or data transfer using wireless or wired connections. In one embodiment, network 204 may facilitate communication between computing devices 202(1)-(N) and/or server 206.

Figure 3:
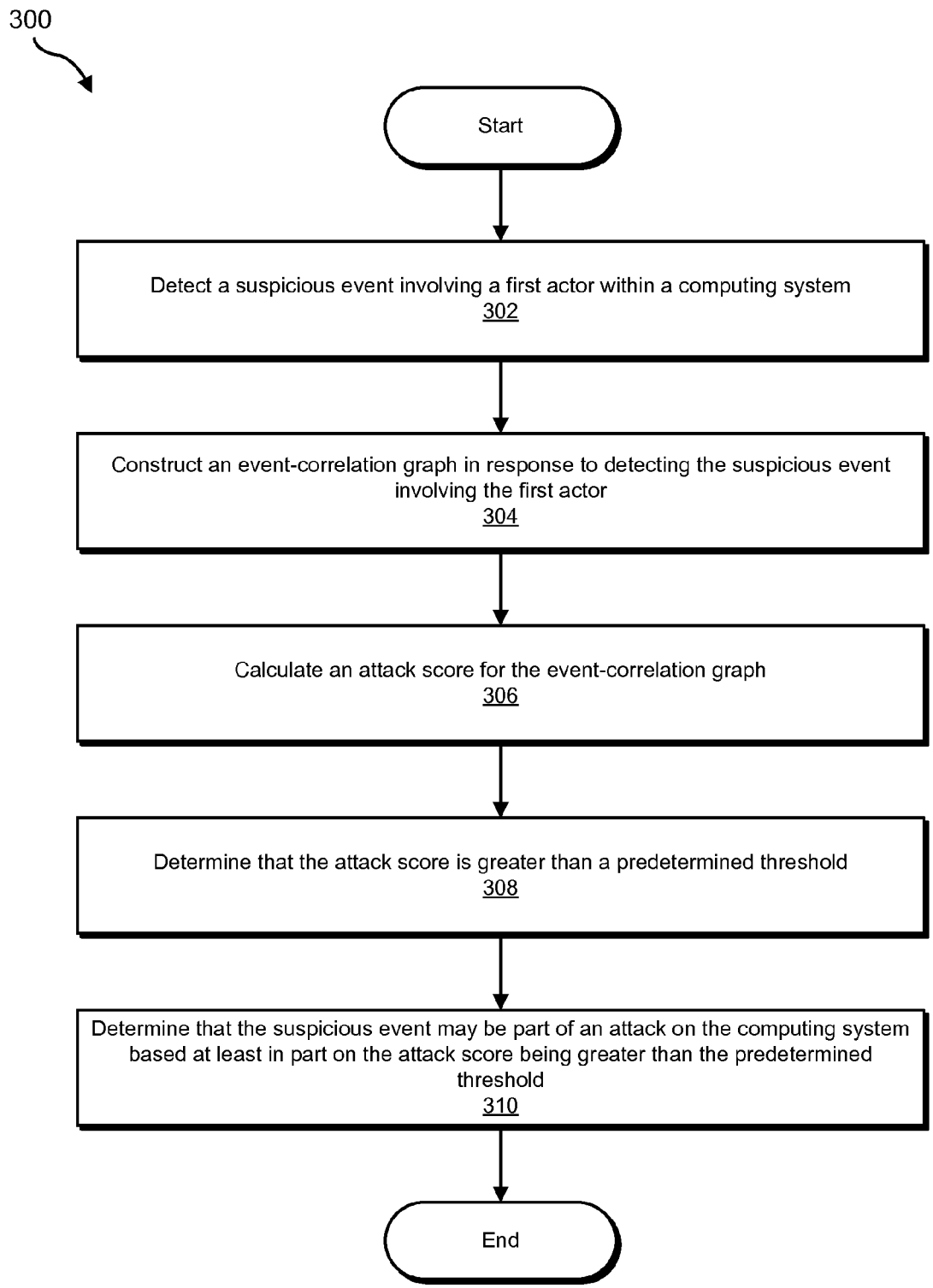
FIG. 3 is a flow diagram of an exemplary method for using event-correlation graphs to detect attacks on computing systems.

FIG. 3 is a flow diagram of an exemplary computer-implemented method 300 for using event-correlation graphs to detect attacks on computing systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1110 in FIG. 11, and/or portions of exemplary network architecture 1200 in FIG. 12.

As illustrated in FIG. 3, at step 302 one or more of the systems described herein may detect a suspicious event involving a first actor within a computing system. For example, detecting module 104 may, as part of server 206 in FIG. 2, detect a suspicious event involving two processes on computing device 202(1) (e.g., a suspicious event wherein a process "viux.exe" injected code into another process "wscntfy.exe").

The term "suspicious event," as used herein, generally refers to any suspicious occurrence within a computing system that may be indicative of an attack on the computing system. In some examples, the term "suspicious event" may refer to an occurrence of one or more behaviors by one or more actors within a computing system that may be indicative of an attack on the computing system. Examples of suspicious events may include, without limitation, a process injecting code into another process, a browser visiting a suspicious website, and the presence of an unknown file. In some examples, suspicious events may be identified using rules that define various attributes of suspicious events. In at least one example, such rules may also define suspiciousness levels or scores for suspicious events.

As used herein, the term "actor" generally refers to any entity that participates in or is otherwise involved with a suspicious event. In some examples, the term "actor" may refer to an entity that may perform an action (e.g., a source actor) and/or an entity that may have an action performed on it (e.g., a target actor). Two or more actors may be considered related if they are both involved in the same suspicious event. Examples of actors may include, without limitation, users, processes, applications, computing devices, files, ports, networks, information resources (e.g., a website), or the like.

Returning to FIG. 3, the systems described herein may perform step 302 in any suitable manner. In one example, detecting module 104 may detect a suspicious event by receiving information about the suspicious event. For example, detecting module 104 may receive information about a suspicious event from a system designed to detect, collect, and/or manage information about suspicious events (e.g., a SIEM, SIM, or SEM). Additionally or alternatively, detecting module 104 may receive information about a suspicious event directly from the system that managed and/or monitored the suspicious event (e.g., a firewall, router, switch, virtual private network, antivirus system, intrusion-detection and/or intrusion-prevention system, vulnerability scanner, web server, web filter, proxy, database, mail and/or groupware system, authentication server, and/or system logger).

In some examples, detecting module 104 may represent a portion of a system designed to detect, collect, and/or manage information about suspicious events and/or a system designed to manage and/or monitor events and may detect a suspicious event as part of the system.

Additionally or alternatively, detecting module 104 may detect a suspicious event by identifying information about a suspicious event that is stored in a database. Using FIG. 2 as an example, detecting module 104 may detect a suspicious event by identifying information about the suspicious event within suspicious events 122 of database 120.

Because the systems described herein may create event-correlation graphs in response to detecting a suspicious event, in at least one example, detecting module 104 may reduce the number of event-correlation graphs created by detecting only highly suspicious events (e.g., suspicious events that are most likely to be part of an attack on a computing system).

At step 304, one or more of the systems described herein may construct an event-correlation graph in response to detecting the suspicious event involving the first actor. For example, constructing module 106 may, as part of server 206 in FIG. 2, construct event-correlation graph 400 in FIG. 4 in response to detecting the suspicious event on computing device 202(1) involving the processes "viux.exe" and "wscntfy.exe."

Figure 4:
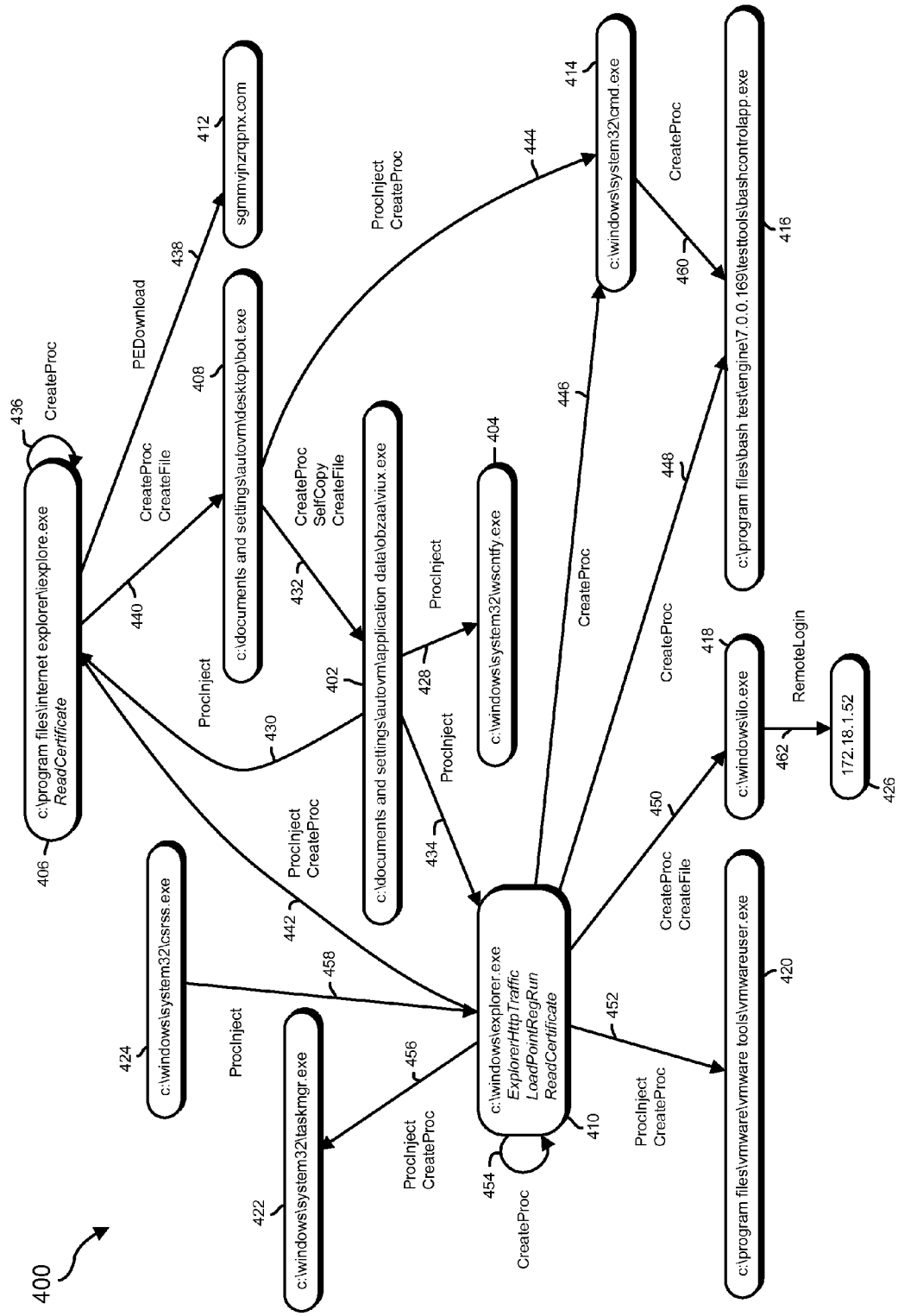
FIG. 4 is a block diagram of an exemplary event-correlation graph.

As used herein, the term "event-correlation graph" generally refers to any logical or graphical representation of two or more suspicious events that are correlated based on how the actors involved in the suspicious events are related by the suspicious events. In some examples, correlation graphs may include (1) representations (e.g., nodes) of the actors involved in suspicious events and (2) representations (e.g., edges) of the suspicious events and/or the relationships between the actors that are based on the suspicious events. FIG. 4 is a block diagram of an exemplary event-correlation graph 400. As shown in FIG. 4, event-correlation graph 400 may include nodes 402-426 interconnected by directed edges 428-462. In this example, nodes 402-426 may represent actors involved with the correlated suspicious events represented by directed edges 428-462, and directed edges 428-462 may represent the correlated suspicious events and/or relationships between the actors involved in the correlated suspicious events. As will be explained in greater detail below, event-correlation graph 400 may represent an event-correlation graph whose creation was triggered by detection of the suspicious event represented by edge 428 that involved processes "viux.exe" and "wscntfy.exe" represented by nodes 402 and 404, respectively.

As used herein, the term "node" generally refers to any representation of an actor within a computing system. In some examples, a node may also be used to represent suspicious events that involve only one actor. The term "edge," as used herein, generally refers to any representation of a suspicious event involving two or more actors within a computing system and/or a relationship that exists between the two or more actors as a result of the suspicious event. In some examples, an edge may include a directed edge that represents the direction of a relationship that exists between two or more actors. In general, suspicious events may be associated with the nodes and/or edges that represent them.

Returning to FIG. 3, the systems described herein may perform step 304 in any suitable manner. In one example, constructing module 106 may construct an event-correlation graph by (1) creating an event-correlation graph that represents a single detected suspicious event (e.g., a triggering suspicious event) and (2) iteratively expanding the event-correlation graph to include additional related suspicious events. Constructing module 106 may create an event-correlation graph that represents a single suspicious event involving two actors (e.g., event-correlation graph 500 in FIG. 5) by creating an event-correlation graph that includes a node for each of the two actors and an edge for the suspicious event that connects the two nodes. Similarly, constructing module 106 may create an event-correlation graph that represents a single suspicious event involving only one actor by creating an event-correlation graph that includes one node for the one actor and by associating the suspicious event with the node.

In some examples, constructing module 106 may iteratively add additional related suspicious events to an event-correlation graph by (1) identifying, for each actor represented within the event-correlation graph, a set of suspicious events that involve the actor and an additional actor and (2) adding a node to the event-correlation graph for each newly identified actor and an edge for each newly identified suspicious event. Additionally or alternatively, constructing module 106 may iteratively add additional related suspicious events to an event-correlation graph by (1) identifying, for each actor represented within the event-correlation graph, a set of suspicious events that involve the actor and no other actor and (2) associating each newly identified suspicious event with the node that represents the actor. In at least one example, constructing module 106 may continue to expand an event-correlation graph until no additional suspicious events can be identified that involve actors represented within the event-correlation graph.

Upon constructing an event-correlation graph, constructing module 106 may store the event-correlation graph to event-correlation graphs 126 in database 120. In some examples, constructing module 106 may continue to iteratively expand event-correlation graphs as new suspicious events are detected. For example, constructing module 106 may periodically update the event-correlation graphs stored within event-correlation graphs 126 as new suspicious events are detected.

FIGS. 5-8 illustrate how constructing module 106 may iteratively construct event-correlation graph 400 in FIG. 4. In the following examples, exemplary event-correlation graph 500 in FIG. 5, exemplary event-correlation graph 600 in FIG. 6, exemplary event-correlation graph 700 in FIG. 7, and exemplary event-correlation graph 800 in FIG. 8 may respectively represent a first, second, third, and forth iteration of event-correlation graph 400. Beginning with FIG. 5, constructing module 106 may generate exemplary event-correlation graph 500 in response to detecting the suspicious event wherein process "viux.exe" injected code into process "wscntfy.exe." As shown, constructing module 106 may generate event-correlation graph 500 such that it includes a node 402 representing process "viux.exe," a node 404 representing process "wscntfy.exe," and an edge 428 that interconnects nodes 402 and 404 and represents the suspicious event involving process "viux.exe" and process "wscntfy.exe."

Figure 5:
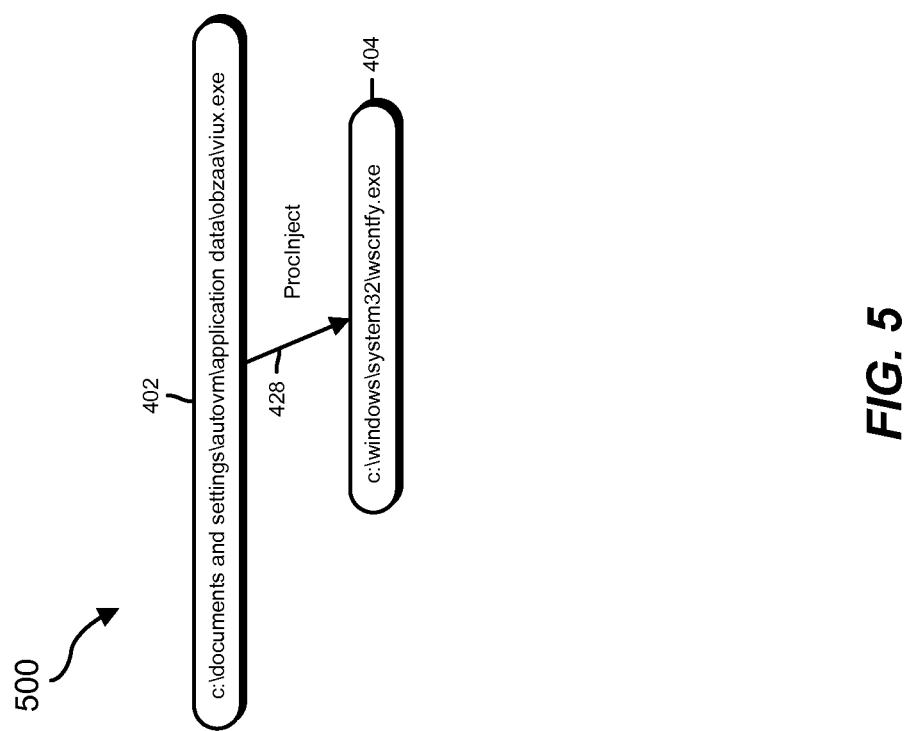
FIG. 5 is a block diagram of an exemplary event-correlation graph.
Figure 6:
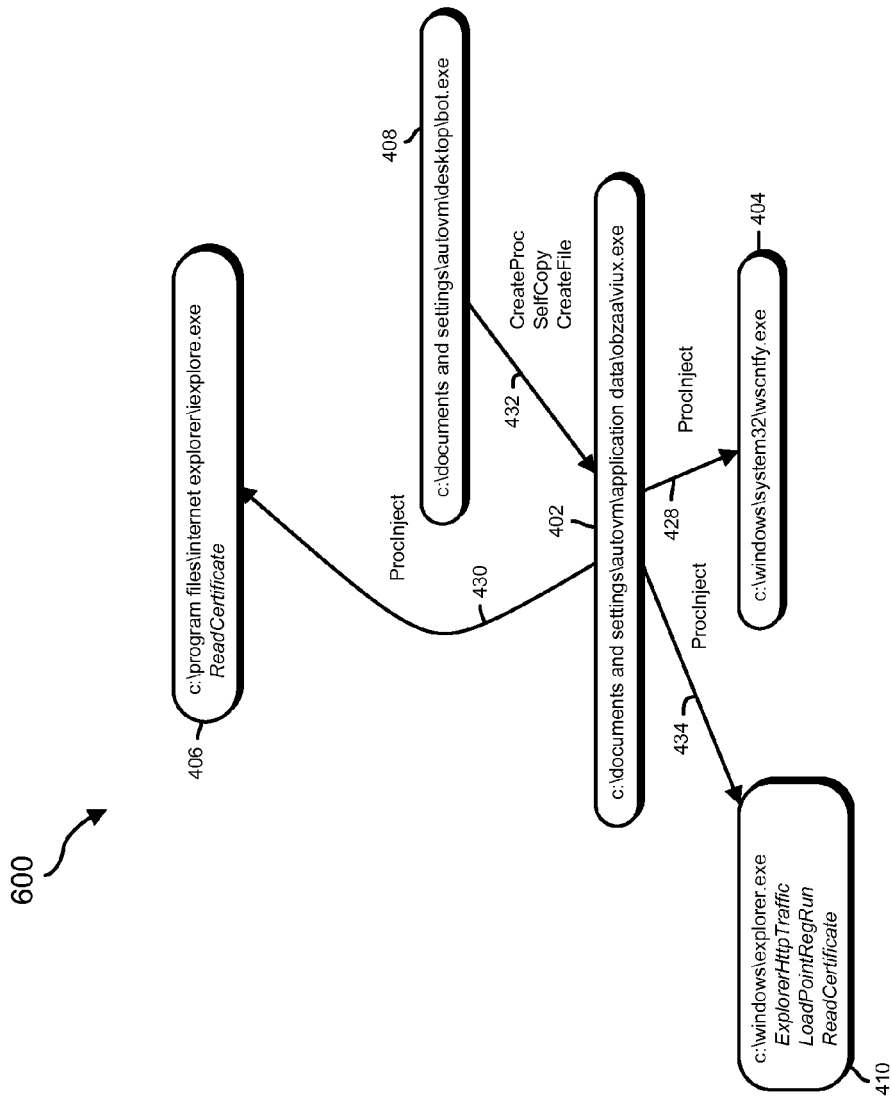
FIG. 6 is a block diagram of an exemplary event-correlation graph.

Upon constructing event-correlation graph 500 in FIG. 5, constructing module 106 may construct event-correlation graph 600 in FIG. 6 from event-correlation graph 500 by (1) identifying additional suspicious events that involve the actors represented in event-correlation graph 500 (e.g., process "viux.exe" and process "wscntfy.exe") and (2) adding, for each identified suspicious event, a representation of the suspicious event to event-correlation graph 500. For example, constructing module 106 may determine that process "viux.exe" participated in five additional suspicious events (e.g., a suspicious event involving the process "iexplore.exe", three suspicious events involving the process "bot.exe", and a suspicious event involving the process "explorer.exe") and may determine that process "wscntfy.exe" participated in no additional suspicious events. As shown in FIG. 6, constructing module 106 may add these newly identified suspicious events to event-correlation graph 500 by adding node 406 connected to node 402 by edge 430 to represent the suspicious event involving processes "viux.exe" and "iexplore.exe," node 408 connected to node 402 by edge 432 to represent the three suspicious events involving processes "viux.exe" and "bot.exe," and node 410 connected to node 402 by edge 434 to represent the suspicious event involving processes "viux.exe" and "explorer.exe."

Figure 7:
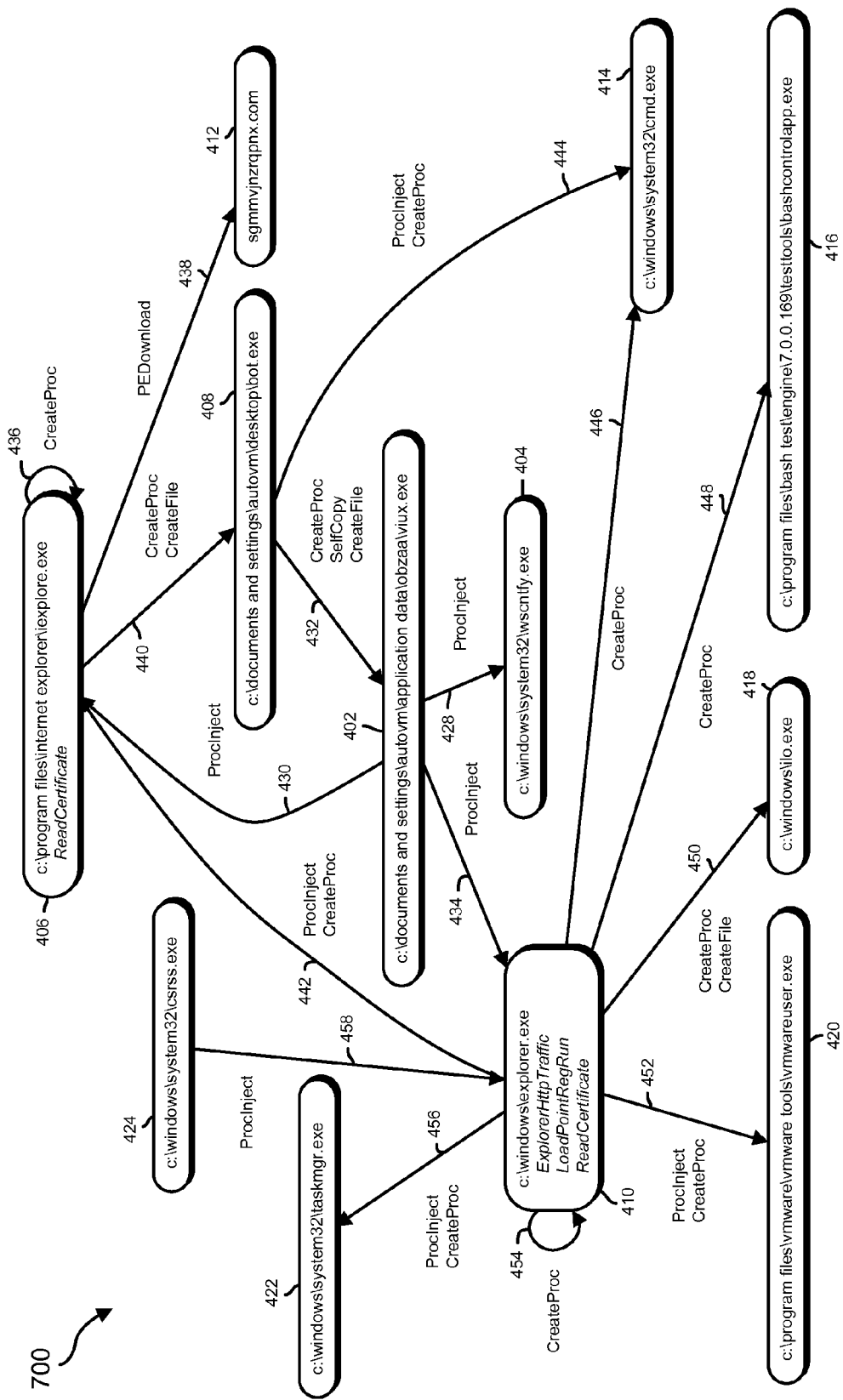
FIG. 7 is a block diagram of an exemplary event-correlation graph.

Upon constructing event-correlation graph 600 in FIG. 6, constructing module 106 may construct exemplary event-correlation graph 700 from event-correlation graph 600 by (1) identifying additional suspicious events that involve the new actors represented in event-correlation graph 600 (e.g., process "iexplore.exe," process "bot.exe," and process "explorer.exe") and (2) adding, for each identified suspicious event, a representation of the suspicious event to event-correlation graph 600 in FIG. 6. For example, constructing module 106 may determine that process "iexplore.exe" participated in six additional suspicious events (e.g., a suspicious event involving itself, a suspicious event involving the website "sgmmvjnzrqpnx.com," two suspicious events involving the process "bot.exe," and two suspicious events involving the process "explorer.exe"). As shown in FIG. 7, constructing module 106 may add these newly identified suspicious events to event-correlation graph 600 by adding edge 436 interconnecting node 406 and itself to represent the suspicious event involving processes "iexplore.exe" and itself, node 412 connected to node 406 by edge 438 to represent the suspicious event involving processes "iexplore.exe" and the website "sgmmvjnzrqpnx.com," edge 440 interconnecting nodes 406 and 408 to represent the two suspicious events involving processes "iexplore.exe" and "bot.exe," and edge 442 interconnecting nodes 406 and 410 to represent the two suspicious events involving processes "iexplore.exe" and "explorer.exe." Constructing module 106 may also determine that process "iexplore.exe" participated in one suspicious event that involved no other actor (e.g., a suspicious event wherein process "iexplore.exe" read a certificate). As shown in FIG. 7, constructing module 106 may add this newly identified suspicious event to event-correlation graph 700 by associating the event with node 406 (e.g., as shown in FIG. 7).

Constructing module 106 may also determine that process "bot.exe" participated in five additional suspicious events (e.g., the two suspicious events involving process "iexplore.exe" and two suspicious events involving the process "cmd.exe"). As shown in FIG. 7, constructing module 106 may add these newly identified suspicious events to event-correlation graph 600 by adding edge 440 interconnecting nodes 406 and 408 to represent the two suspicious events involving processes "bot.exe" and "iexplore.exe" and node 414 connected to node 408 by edge 444 to represent the two suspicious events involving processes "bot.exe" and "cmd.exe."

Constructing module 106 may further determine that process "explorer.exe" participated in twelve additional suspicious events (e.g., a suspicious event involving process "cmd.exe," a suspicious event involving process "bashcontrolapp.exe," two suspicious events involving process "ilo.exe," two suspicious events involving process "vmwareuser.exe," a suspicious event involving itself, two suspicious events involving process "taskmgr.exe," a suspicious event involving process "csrss.exe," and the two suspicious events involving the process "iexplore.exe"). As shown in FIG. 7, constructing module 106 may add these newly identified suspicious events to event-correlation graph 600 by adding edge 446 interconnecting nodes 410 and 414 to represent the suspicious event involving processes "explorer.exe" and "cmd.exe," node 416 connected to node 410 by edge 448 to represent the suspicious event involving processes "explorer.exe" and "bashcontrolapp.exe," node 418 connected to node 410 by edge 450 to represent the two suspicious events involving processes "explorer.exe" and "ilo.exe," node 420 connected to node 410 by edge 452 to represent the two suspicious events involving processes "explorer.exe" and "vmwareuser.exe," edge 454 interconnecting node 410 and itself to represent the suspicious event involving processes "explorer.exe" and itself, node 422 connected to node 410 by edge 456 to represent the two suspicious events involving processes "explorer.exe" and "taskmgr.exe," node 424 connected to node 410 by edge 458 to represent the suspicious event involving processes "explorer.exe" and "csrss.exe," and edge 442 interconnecting nodes 406 and 410 to represent the two suspicious events involving processes "explorer.exe" and "iexplore.exe."

Constructing module 106 may also determine that process "explorer.exe" participated in three suspicious events that involved no other actor (e.g., a suspicious event wherein process "explorer.exe" generated hypertext-transfer-protocol (HTTP) traffic, a suspicious event wherein process "explorer.exe" added a load point to a system registry, and a suspicious event wherein process "explorer.exe" read a certificate). As shown in FIG. 7, constructing module 106 may add these newly identified suspicious events to event-correlation graph 700 by associating them with node 410.

Figure 8:
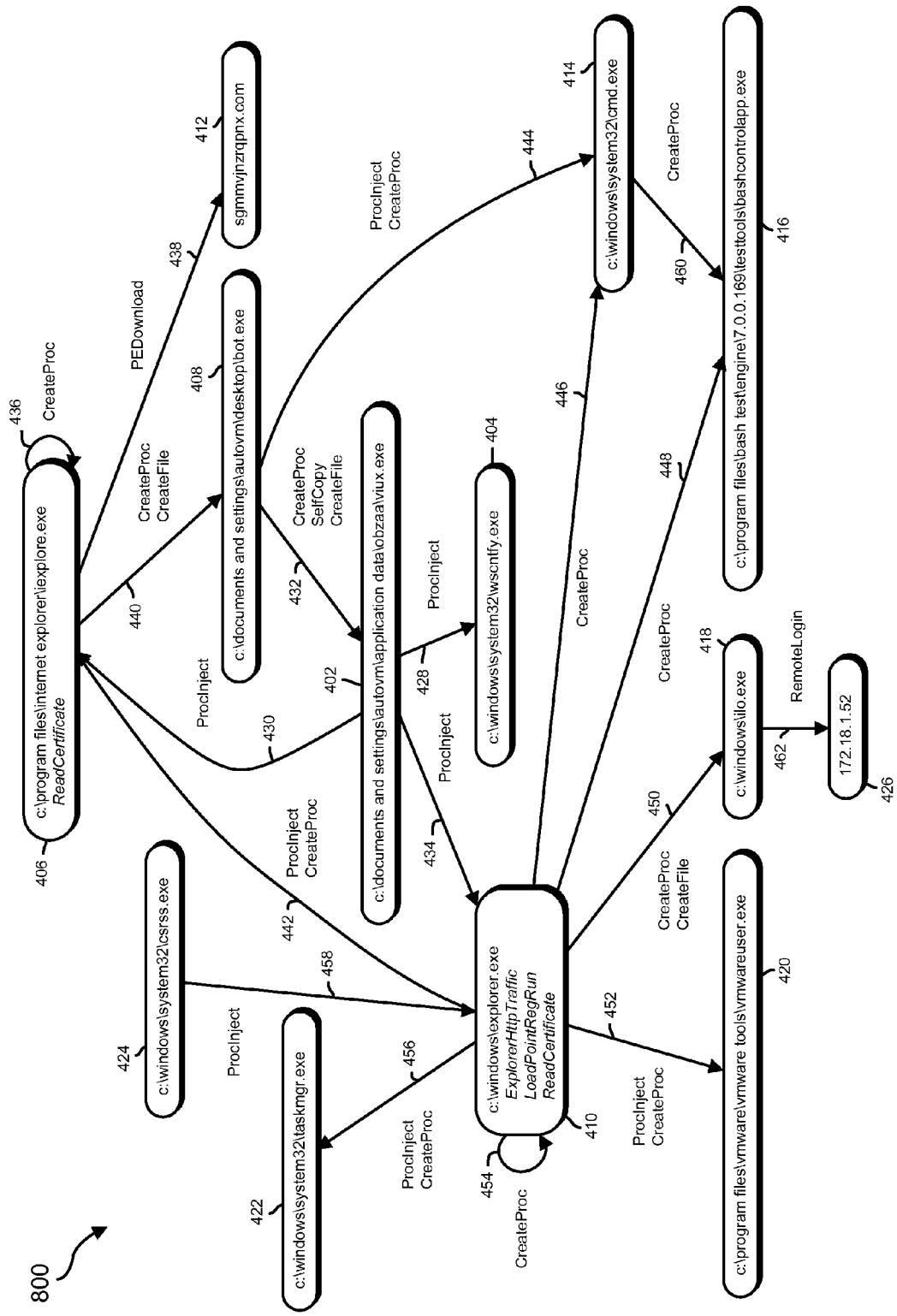
FIG. 8 is a block diagram of an exemplary event-correlation graph.

Upon constructing event-correlation graph 700 in FIG. 7, constructing module 106 may construct exemplary event-correlation graph 800 by (1) identifying a set of additional suspicious events that involve the new actors represented in event-correlation graph 700 and (2) adding, for each identified suspicious event, a representation of the suspicious event to event-correlation graph 700. For example, constructing module 106 may determine that process "cmd.exe" participated in one additional suspicious event (e.g., a suspicious event involving process "bashcontrolapp.exe," that process "ilo.exe" participated in one additional suspicious event (e.g., a suspicious event involving process the address "172.18.1.52," and that every other newly added actor was involved in no additional suspicious events. As shown in FIG. 8, constructing module 106 may add these newly identified suspicious events to event-correlation graph 700 by adding edge 460 interconnecting nodes 414 and 416 to represent the suspicious event involving processes "cmd.exe" and "bash-controlapp.exe" and node 426 connected to node 418 by edge 462 to represent the suspicious event involving process "ilo.exe" and the address "172.18.1.52." Upon constructing event-correlation graph 800 in FIG. 8, constructing module 106 may determine that event-correlation graph 800 is complete by determining that no newly added actors participated in any additional suspicious events.

Returning to FIG. 3 at step 306, one or more of the systems described herein may calculate an attack score for the event-correlation graph. For example, score-calculating module 108 may, as part of server 206 in FIG. 2, calculate an attack score for event-correlation graph 400 in FIG. 4.

The systems described herein may perform step 306 in any suitable manner. For example, score-calculating module 108 may calculate an attack score for an event-correlation graph by (1) identifying all or a portion of the suspicious events represented within the event-correlation graph, (2) identifying a suspiciousness score associated with each of the identified suspicious events, and (3) using the suspiciousness scores to calculate an attack score for the event-correlation graph. In one example, score-calculating module 108 may calculate an attack score for an event-correlation graph by simply adding together the suspiciousness scores of each suspicious event represented within the event-correlation graph.

Figure 9:
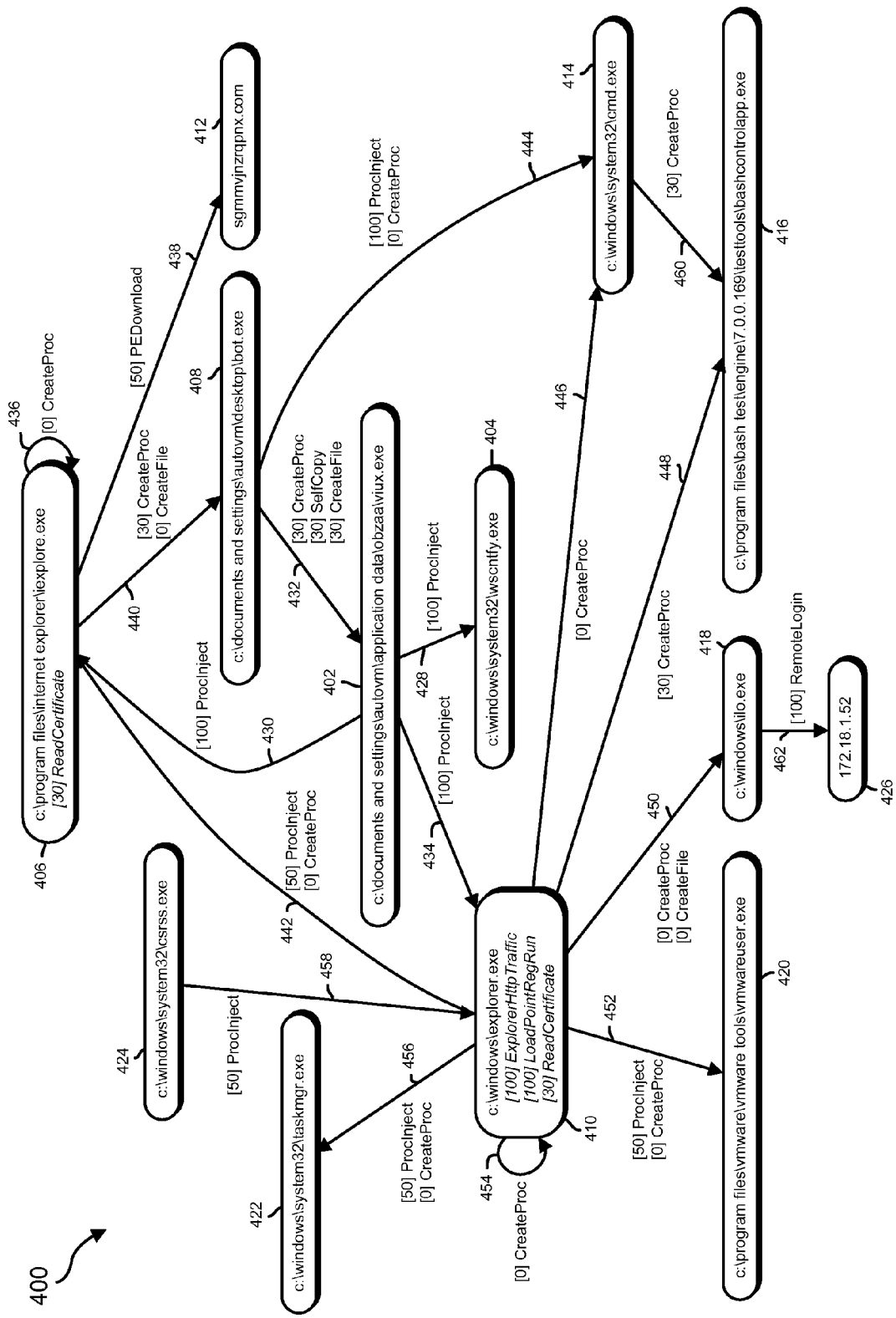
FIG. 9 is a block diagram of an exemplary event-correlation graph.

Using FIG. 9 as an example, score-calculating module 108 may calculate an attack score for event-correlation graph 400 by (1) identifying all of the suspicious events represented within the event-correlation graph, (2) identifying a suspiciousness score associated with each of the identified suspicious events (e.g., as illustrated in FIG. 9 by the bracketed numbers next to each suspicious event in event-correlation graph 400), and (3) determining that the attack score for event-correlation graph 400 equals 1190 by adding together the suspiciousness scores of each suspicious event represented within event-correlation graph 400.

Additionally or alternatively, score-calculating module 108 may calculate an attack score for an event-correlation graph based on scores for each node and/or edge within the event-correlation graph. For example, score-calculating module 108 may calculate an attack score for an event-correlation graph by (1) calculating a score for each edge within the event-correlation graph based on the suspiciousness scores associated with the suspicious events represented by the edge, (2) calculating a score for each node within the event-correlation graph based at least in part on the suspiciousness scores associated with each suspicious event associated with the node, and (3) summing the scores of each node and edge within the event-correlation graph.

Figure 10:
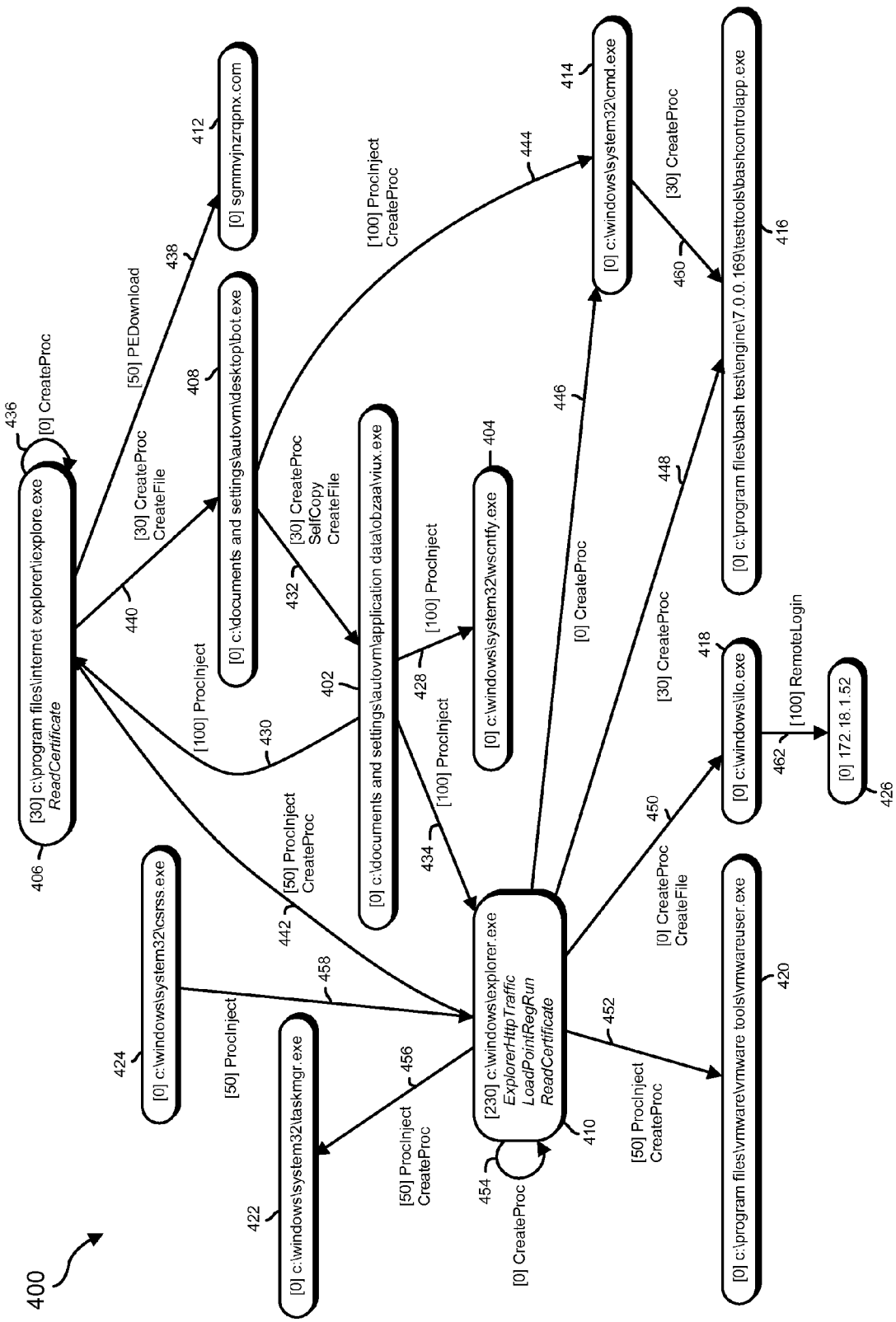
FIG. 10 is a block diagram of an exemplary event-correlation graph.

Using FIG. 10 as an example, score-calculating module 108 may calculate an attack score for event-correlation graph 400 by (1) calculating a score for each edge within event-correlation graph 400 based on the suspiciousness scores associated with the suspicious events represented by the edge (e.g., as illustrated in FIG. 10 by the bracketed number next to each edge in event-correlation graph 400), (2) calculating a score for each node within event-correlation graph 400 based at least in part on the suspiciousness scores associated with each suspicious event associated with the node (e.g., as illustrated in FIG. 10 by the bracketed number within each node in event-correlation graph 400), and (3) determining that the attack score for event-correlation graph 400 equals 1190 by summing the scores of each node and edge within event-correlation graph 400.

Returning to FIG. 3 in addition to or as an alternative to calculating attack scores base on the suspiciousness scores of suspicious events, score-calculating module 108 may calculate an attack score for an event-correlation graph based on the size of the event-correlation graph. For example, score-calculating module 108 may calculate an attack score for an event-correlation graph based on the number of nodes, edges, and/or suspicious events within the event-correlation graph.

In some instances, it may be possible that many benign actors may become part of an event-correlation graph due to a benign suspicious event. Score-calculating module 108 may address this problem by pruning the benign actors from the event-correlation graph. In some examples, score-calculating module 108 may prune benign actors from an event-correlation graph by removing low-scoring regions of nodes from the event-correlation graph before calculating an attack score for the event-correlation graph. A region of nodes may include any node within an event-correlation graph along with any other nodes that are within a predetermined distance from the node. In at least one example, score-calculating module 108 may prune benign actors from an event-correlation graph by calculating a score for each region of nodes within the event-correlation graph and by removing regions of nodes whose scores fall below a predetermined threshold.

Additionally or alternatively, score-calculating module 108 may prune benign actors from an event-correlation graph by removing remote nodes from the event-correlation graph based on the distance of the remote node from the node representing the actor involved in the suspicious event that triggered the construction of the event-correlation graph being greater than predetermined threshold.

At step 308, one or more of the systems described herein may determine that the attack score is greater than a predetermined threshold. For example, threshold-determining module 110 may, as part of server 206 in FIG. 2, determine that the attack score for event-correlation graph 400 in FIG. 4 is greater than a predetermined threshold.

The systems described herein may perform step 308 in any suitable manner. In one example, threshold-determining module 110 may determine that the attack score is greater than a predetermined threshold that was provided by an administrator or a user of a computing system. In another example, threshold-determining module 110 may determine that the attack score is greater than a predetermined threshold that is based on the attack scores of other event-correlation graphs. For example, threshold-determining module 110 may determine that the attack score is greater than an average attack score and/or determine that the attack score is greater than the attack scores of a predetermined percentage of other event-correlation graphs. By using a threshold based on other event-correlation graphs, threshold-determining module 110 may identify only event-correlation graphs that are most likely to be part of an attack on a computing system.

At step 310, one or more of the systems described herein may determine, based at least in part on the attack score being greater than the predetermined threshold, that the suspicious event may be part of an attack on the computing system. For example, attack-determining module 112 may, as part of server 206 in FIG. 2, determine that the suspicious event involving the processes "viux.exe" and "wscntfy.exe" may be part of an attack on computing device 202(1) based at least in part on attack score of event-correlation graph 400 in FIG. 4 being greater than a predetermined threshold.

The systems described herein may perform step 310 in any suitable manner. For example upon determining that a suspicious event may be part of an attack on a computing system, attack-determining module 112 may alert an administrator or a user of the computing system of the detected attack. Additionally or alternatively, attack-determining module 112 may block the attack and/or protect the computing system from the attack. For example, attack-determining module 112 may quarantine the actors involved in the attack.

In some examples, attack-determining module 112 may generate and display graphical representations of event-correlation graphs to an administrator or user of the computing system such that the administrator or user may analyze the attacks that they represent. In some examples, the systems described herein may label nodes and edges within an event-correlation graph with information about the actors and/or the suspicious events that they represent (e.g., as illustrated in FIGS. 4 and 9). By presenting graphical representations of event-correlation graphs, attack-determining module 112 may provide forensic information about the contexts within which attacks occur. Upon completion of step 310, exemplary method 300 in FIG. 3 may terminate.

As explained above, by using suspicious events to construct event-correlation graphs based on how the actors involved in the suspicious events are related by the suspicious events, the systems and methods described herein may enable the detection of targeted attacks on computing systems. Furthermore, in some examples, by detecting attacks on computing systems using a graph-based correlation approach, these systems and methods may generate information that may provide a greater understanding of the attacks (e.g., the actors and methods involved in the attacks).

For example, the systems and methods described herein may detect an attack on a computing system by (1) collecting information about suspicious events from one or more host-based or network-based detectors, (2) using the suspicious events to build an event-correlation graph based on how the actors involved in the suspicious events are related by the suspicious events, (3) calculating a score for the event-correlation graph based on the suspicious events contained within the event-correlation graph, and (4) determining that the score for the event-correlation graph indicates that the suspicious events are likely part of an attack on the computing system.

Figure 11:
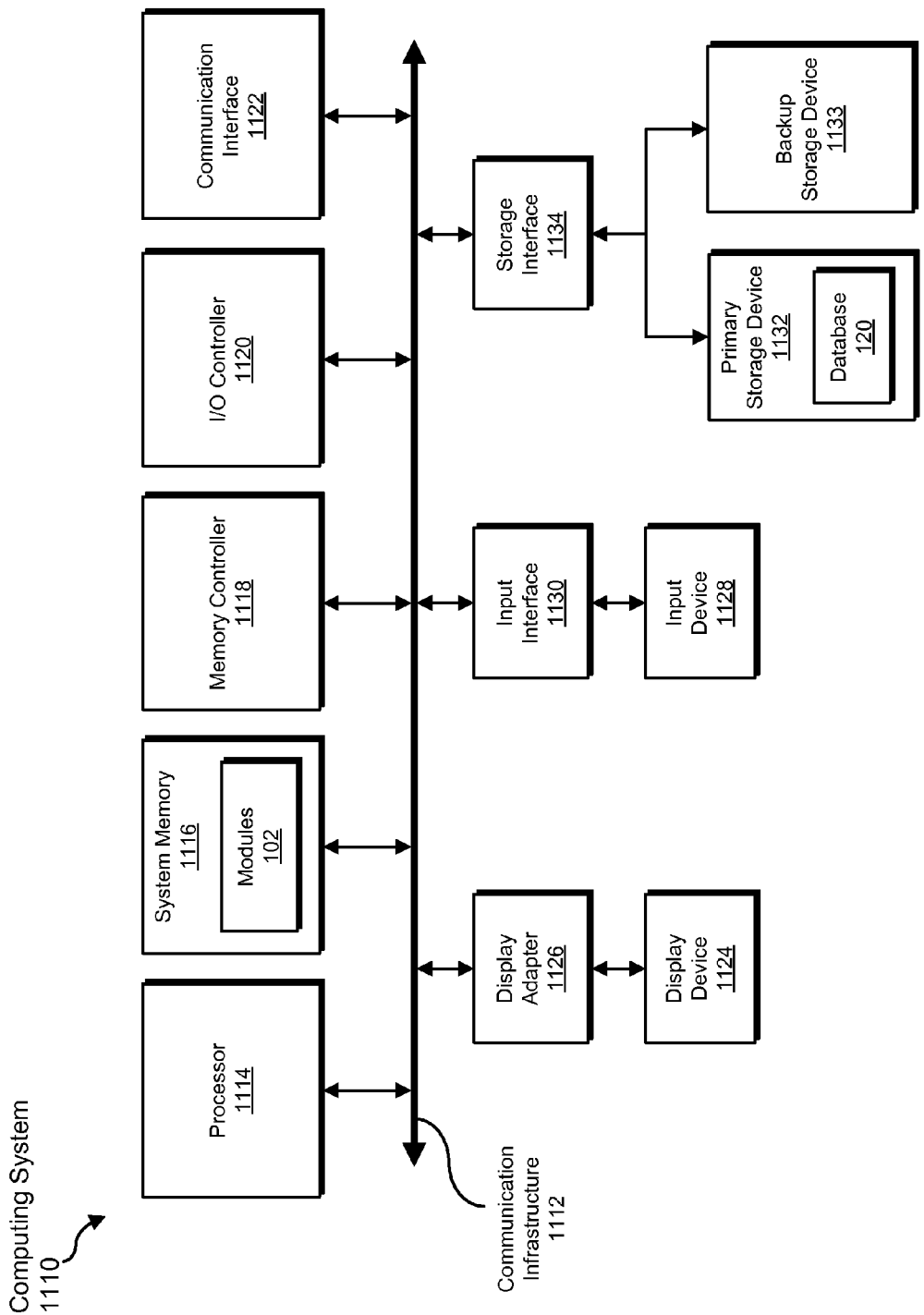
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the exemplary embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In certain embodiments, exemplary computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110. In one example, database 120 from FIG. 1 may be stored in primary storage device 1132.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 1110. All or a portion of the computer program stored on the computer-readable-storage medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an Application Specific Integrated Circuit (ASIC) adapted to implement one or more of the exemplary embodiments disclosed herein.

Figure 12:
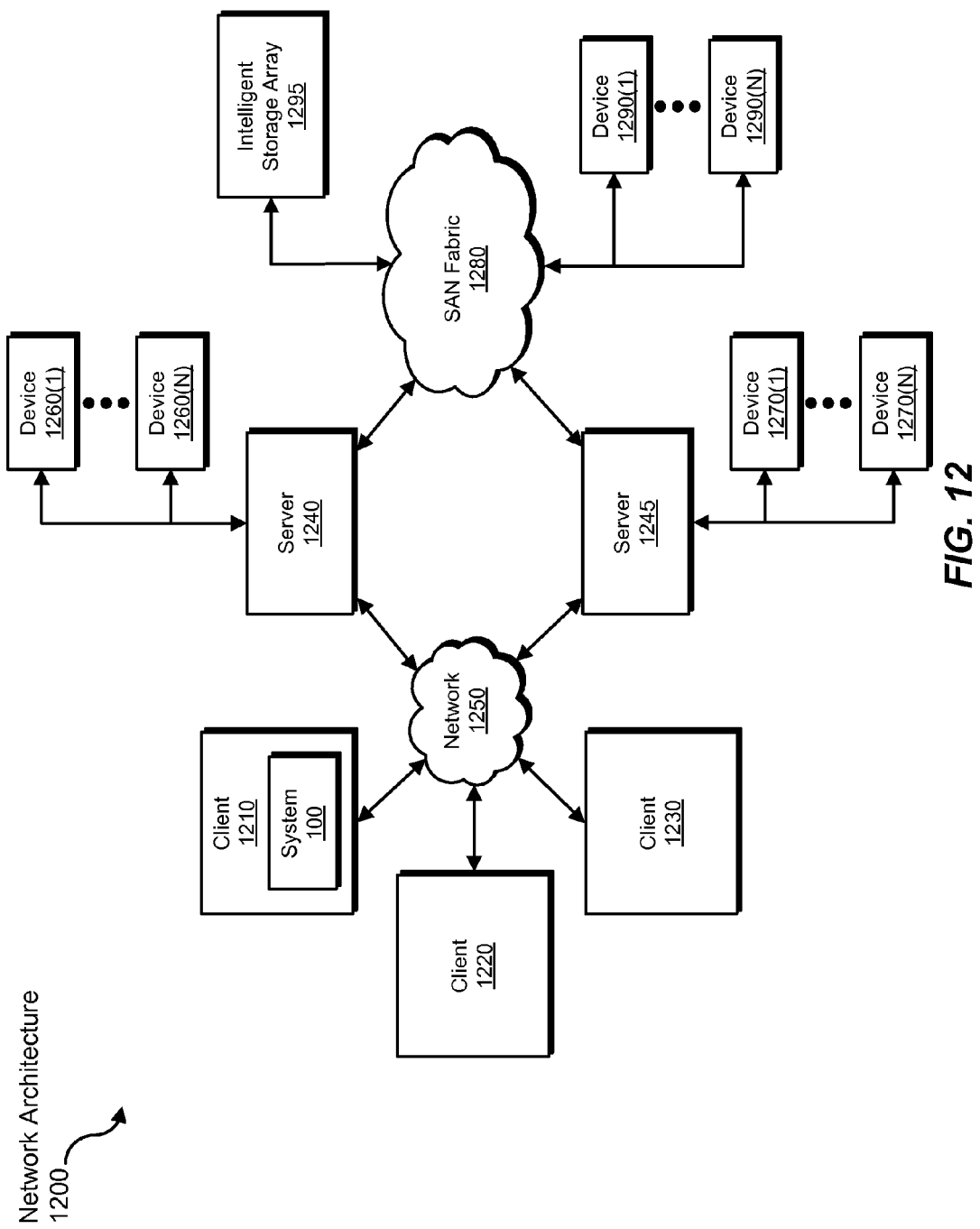
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3). All or a portion of network architecture 1200 may also be used to perform and/or be a means for performing other steps and features set forth in the instant disclosure.

Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an exemplary method for using event-correlation graphs to detect attacks on computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data about one or more suspicious events to be transformed, transform the data about one or more suspicious events into an event-correlation graph, output a result of the transformation to an attack-detecting system capable of determining whether the one or more suspicious events are part of an attack on a computing system, use the result of the transformation to determine whether the one or more suspicious events are part of an attack on the computing system by calculating an attack score for the event-correlation graph, and store the result of the transformation to a database accessible to the attack-detecting system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for using event-correlation graphs to detect attacks on computing systems, at least a portion of the method being performed by a computing device comprising at least one physical processor, the method comprising:
    detecting a suspicious event involving a first actor within a computing system, wherein the suspicious event could not be individually classified as definitively malicious;
    constructing, in response to detecting the suspicious event involving the first actor, an event-correlation graph, wherein:
        the event-correlation graph comprises at least:
            a first node that represents the first actor;
            a second node that represents a second actor;
            an edge that:
                interconnects the first node and the second node;
                represents an additional suspicious event involving the first actor and the second actor;
        the additional suspicious event could not be individually classified as definitively malicious;
        each suspicious event represented in the event-correlation graph could not be individually classified as definitively malicious;
    calculating, based at least in part on the additional suspicious event involving the first actor and the second actor, an attack score for the event-correlation graph;
    determining that the attack score is greater than a predetermined threshold;
    determining, based at least in part on the attack score being greater than the predetermined threshold, that the suspicious event comprises an attack on the computing system, wherein the step of constructing the event-correlation graph is performed by the computing device.

2. The computer-implemented method of claim 1, wherein constructing the event-correlation graph comprises, for each actor represented by a node within the event-correlation graph:
identifying a set of events that involve the actor and at least one additional actor;
for each event within the set of events:
adding an additional node to the event-correlation graph that represents the additional actor;
adding an additional edge to the event-correlation graph that:
interconnects the node and additional node;
represents the event involving the actor and the additional actor.

3. The computer-implemented method of claim 2, wherein the set of events comprises a set of suspicious events.

4. The computer-implemented method of claim 1, wherein constructing the event-correlation graph comprises, for each actor represented by a node within the event-correlation graph:
identifying a set of suspicious events that involve the actor and no other actor;
associating each suspicious event within the set of suspicious events with the node that represents the actor.

5. The computer-implemented method of claim 1, wherein:
each suspicious event represented within the event-correlation graph is associated with a suspiciousness score;
calculating the attack score for the event-correlation graph comprises summing the suspiciousness scores of each suspicious event represented within the event-correlation graph.

6. The computer-implemented method of claim 1, wherein calculating the attack score for the event-correlation graph comprises:
calculating a score for each edge within the event-correlation graph based at least in part on a suspiciousness score associated with the suspicious event represented by the edge;
calculating the attack score for the event-correlation graph comprises summing the scores of each edge within the event-correlation graph.

7. The computer-implemented method of claim 1, wherein calculating the attack score for the event-correlation graph comprises:
calculating a score for each node within the event-correlation graph based at least in part on a suspiciousness score associated with each suspicious event associated with the node;
calculating the attack score for the event-correlation graph comprises summing the scores of each node within the event-correlation graph.

8. The computer-implemented method of claim 1, further comprising removing, before calculating the attack score for the event-correlation graph, at least one low-scoring region of nodes from the event-correlation graph based at least in part on a score of the low-scoring region of nodes being less than an additional predetermined threshold.

9. The computer-implemented method of claim 1, further comprising removing, before calculating the attack score for the event-correlation graph, at least one remote node from the event-correlation graph based at least in part on a distance of the remote node from the first node being greater than an additional predetermined threshold.

10. The computer-implemented method of claim 1, wherein:
the suspicious event could not be individually classified as definitively malicious or legitimate;
the additional suspicious event could not be individually classified as definitively malicious or legitimate;
each suspicious event represented in the event-correlation graph could not be individually classified as definitively malicious or legitimate.

11. A system for using event-correlation graphs to detect attacks on computing systems, the system comprising:
a detecting module, stored in memory, that detects a suspicious event involving a first actor within a computing system, wherein the suspicious event could not be individually classified as definitively malicious;
a constructing module, stored in memory, that constructs, in response to detecting the suspicious event involving the first actor, an event-correlation graph, wherein:
the event-correlation graph comprises at least:
a first node that represents the first actor;
a second node that represents a second actor within the computing system;
an edge that:
interconnects the first node and the second node;
represents an additional suspicious event involving the first actor and the second actor;
the additional suspicious event could not be individually classified as definitively malicious;
each suspicious event represented in the event-correlation graph could not be individually classified as definitively malicious;
a score-calculating module, stored in memory, that calculates, based at least in part on the additional suspicious event involving the first actor and the second actor, an attack score for the event-correlation graph;
a threshold-determining module, stored in memory, that determines that the attack score is greater than a predetermined threshold;
an attack-determining module, stored in memory, that determines, based at least in part on the attack score being greater than the predetermined threshold, that the suspicious event comprises an attack on the computing system;
at least one physical processor that executes the detecting module, the constructing module, the score-calculating module, the threshold-determining module, and the attack-determining module.

12. The system of claim 11, wherein the constructing module constructs the event-correlation graph by, for each actor represented by a node within the event-correlation graph:
identifying a set of events that involve the actor and at least one additional actor;
for each event within the set of events:
adding an additional node to the event-correlation graph that represents the additional actor;
adding an additional edge to the event-correlation graph that:
interconnects the node and additional node;
represents the event involving the actor and the additional actor.

13. The system of claim 12, wherein the set of events comprises a set of suspicious events.

14. The system of claim 11, wherein the constructing module constructs the event-correlation graph by, for each actor represented by a node within the event-correlation graph:
identifying a set of suspicious events that involve the actor and no other actor;

associating each suspicious event within the set of suspicious events with the node that represents the actor.

15. The system of claim 11, wherein:
each suspicious event represented within the event-correlation graph is associated with a suspiciousness score;
the score-calculating module calculates the attack score for the event-correlation graph based at least in part on the suspiciousness score of each suspicious event represented within the event-correlation graph.

16. The system of claim 11, wherein the score-calculating module calculates the attack score for the event-correlation graph by:
calculating a score for each edge within the event-correlation graph based at least in part on a suspiciousness score associated with the suspicious event represented by the edge;
calculating the attack score for the event-correlation graph based at least in part on the score for each edge within the event-correlation graph.

17. The system of claim 11, wherein the score-calculating module calculates the attack score for the event-correlation graph by:
calculating a score for each node within the event-correlation graph based at least in part on a suspiciousness score associated with each suspicious event associated with the node;
calculating the attack score for the event-correlation graph based at least in part on the score for each node within the event-correlation graph.

18. The system of claim 11, wherein the constructing module further removes, before the attack score for the event-correlation graph is calculated, at least one low-scoring region of nodes from the event-correlation graph based at least in part on a score of the low-scoring region of nodes being less than an additional predetermined threshold.

19. The system of claim 11, wherein the constructing module further removes, before the attack score for the event-correlation graph is calculated, at least one remote node from the event-correlation graph based at least in part on a distance of the remote node from the first node being greater than an additional predetermined threshold.

20. A non-transitory computer-readable medium comprising one or more computer-executable instructions that, when executed by at least one processor of a computing device, cause the computing device to:
detect a suspicious event involving a first actor within a computing system, wherein the suspicious event could not be individually classified as definitively malicious;
construct, in response to detecting the suspicious event involving the first actor, an event-correlation graph, wherein:
the event-correlation graph comprises at least:
a first node that represents the first actor;
a second node that represents a second actor within the computing system;
an edge that:
interconnects the first node and the second node;
represents an additional suspicious event involving the first actor and the second actor;
the additional suspicious event could not be individually classified as definitively malicious;
each suspicious event represented in the event-correlation graph could not be individually classified as definitively malicious;
calculate, based at least in part on the additional suspicious event involving the first actor and the second actor, an attack score for the event-correlation graph;
determine that the attack score is greater than a predetermined threshold;
determine, based at least in part on the attack score being greater than the predetermined threshold, that the suspicious event comprises an attack on the computing system.

* * * * *